May 9, 1939.  J. B. SINNETT  2,157,191

METHOD OF AND MEANS FOR COOLING MOTORS

Filed July 31, 1936  2 Sheets-Sheet 1

Inventor
John B. Sinnett
By Mason Jackson Boettcher Downs
Attys.

May 9, 1939.  J. B. SINNETT  2,157,191

METHOD OF AND MEANS FOR COOLING MOTORS

Filed July 31, 1936   2 Sheets-Sheet 2

Inventor
John B. Sinnett

Patented May 9, 1939

2,157,191

UNITED STATES PATENT OFFICE 2,157,191

METHOD OF AND MEANS FOR COOLING MOTORS

John B. Sinnett, Howell, Mich., assignor to Howell Electric Motors Company, Howell, Mich., a corporation of Michigan Application July 31, 1936, Serial No. 93,535

14 Claims. (Cl. 172—36)

This invention relates to a method of and means for cooling motors, and more particularly is directed to use with splash-proof electric motors of the enclosed type.

In many industrial establishments, such as breweries, distilleries, laundries, dairies and other like plants, the motive power for the machinery is supplied by electric motors, and these motors are oftentimes positioned in damp locations and subjected to falling or splashing of liquids thereover. Also, in some plants, hoses are used for washing off machinery, walls and floors, and in such cases the motor must be of a splash-proof type in order to operate satisfactorily under such conditions.

The present invention contemplates a splash-proof type of motor, so designed that liquid splashed thereover cannot enter into the interior of the motor housing, but capable of circulating large volumes of cooling air over the stator and rotor, thus assuring ample ventilation, full heat radiation, and cool operating temperature.

One of the main objects of the present invention is the provision of an enclosed splash-proof motor having means for circulating cooling air over the stator and rotor without decreasing to any appreciable extent the splash-proof characteristics of the motor.

Another object of the present invention is to produce the circulation of cooling air through the motor, with the entrance and exit ducts for the air lying parallel to each other about the circumference of the motor.

Still another object of the present invention is to provide for air circulation over the entire stator core and all of the coils in the motor, to produce full heat radiation and cooling thereof. In this connection, provision is made so that the air exhausted from the motor after circulation therethrough is deflected away from the inlet through which fresh air is drawn into the motor casing, in order to prevent recirculation of any appreciable amount of air which has already passed through the motor.

One of the advantages of the present construction is that the cooling air enters and exhausts underneath the motor, whereby the end plates may remain totally enclosed. In addition, the present construction is so designed that all external dimensions of the motor, both as regards stator frames and end plates, remain identical with open type motors of the same rating. The end plates used in the present construction are of the same shape as the end plates on an open type motor, making it possible to reproduce any special registers, flange mountings or the like that are available in open type motors, such reproduction being capable of being carried out with facility and without requiring any alterations in the end plates themselves.

Another feature of the present invention is the provision of a construction whereby the same splash-proof and cooling characteristics are available when motors of this type are mounted in inverted positions on ceilings and the like.

Other objects and advantages of the present invention will appear more fully from the following detailed description which, taken in conjunction with the accompanying drawings, will disclose to those skilled in the art the particular construction and operation of a preferred form of the present invention.

Figure 1:
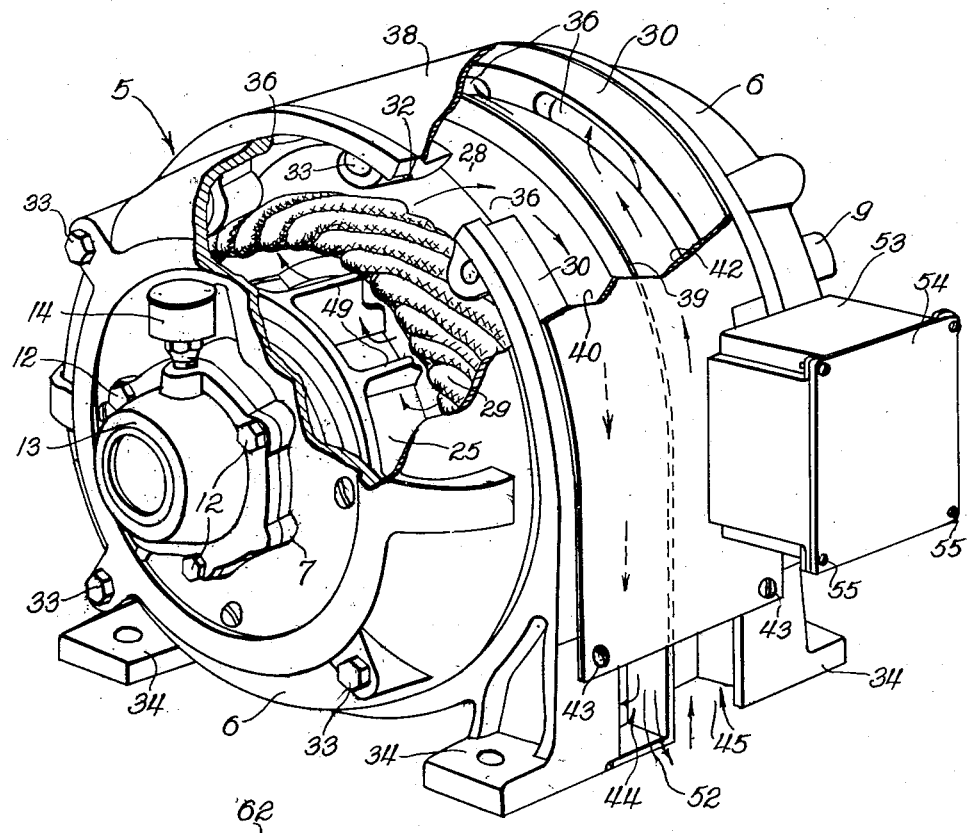
Figure 1 is a perspective view, partially broken away, showing a motor embodying the present invention.
Figure 2:
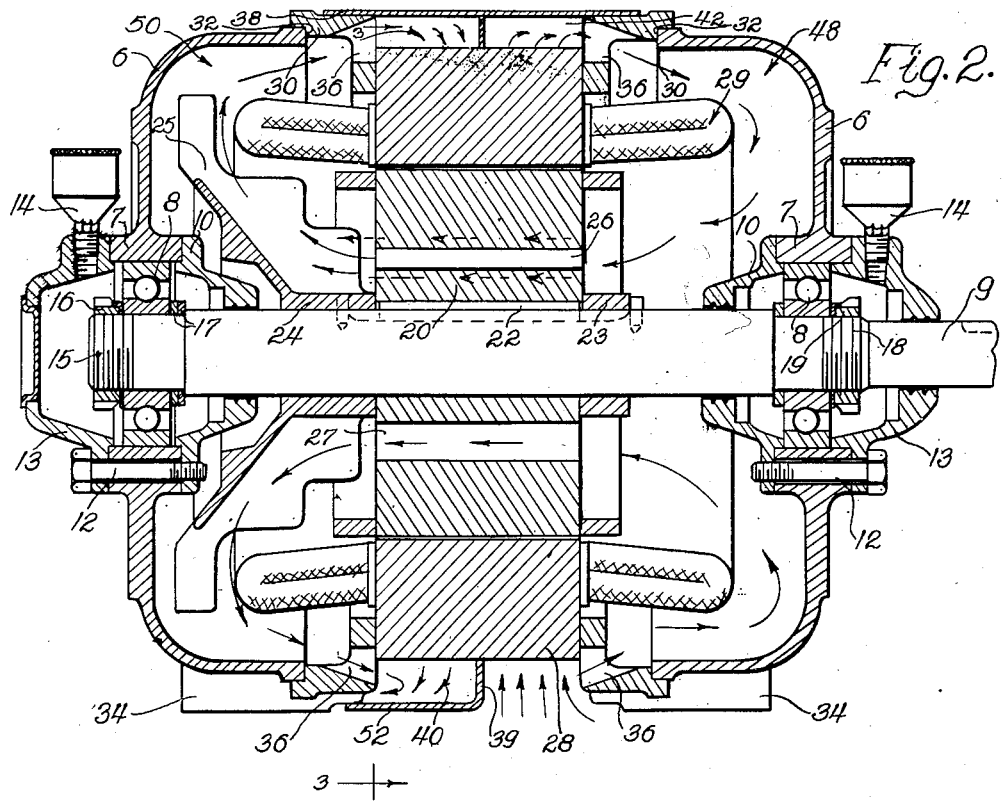
Figure 2 is a vertical sectional view through the motor.
Figure 3:
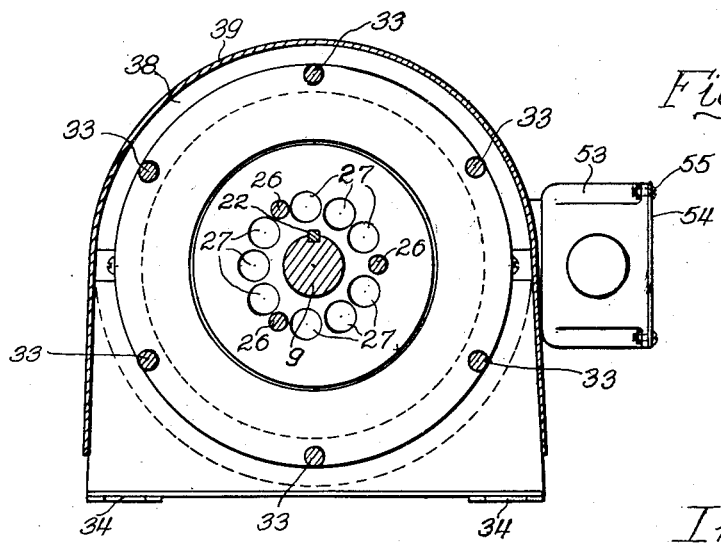
Figure 3 is a vertical sectional view taken substantially on line 3—3 of Figure 2.

Referring now in detail to Figures 1 to 3, inclusive, I have provided a motor indicated generally at 5, having enclosed end plates 6 which are of generally disk-shape, and which have centrally disposed flanged portions 7 defining openings for receiving the bearings 8 which mount the motor shaft 9 in fixed position with respect to the end plates 6.

The bearings 8, which are preferably ball bearings, are retained in position by means of the inner retaining rings 10 which are secured to the inner face of the flanges 7 by means of the bolts 12 extending through the outer retaining rings 13 and through the flange into threaded engagement with the inner retaining rings 10. Each of the outer retaining rings 13 is provided with a grease cup member 14 carried thereby, for admitting lubricant to the interior of the bearing housing formed by the rings 10 and 13.

The shaft 9 at one end is provided with a reduced portion 15, which is threaded to receive the lock nut 16 for holding the inner race of the bearings 8 at this end of the shaft in position. Thrust washers 17 are also provided at the shouldered portion of the shaft for centering the shaft with respect to the bearings. At the opposite end of the motor, a second reduced portion 18 is provided on the shaft, which is threaded to receive the lock nut 19 which serves to hold the shaft in fixed position against axial movement with respect to the bearings 8.

Mounted on the shaft 9 intermediate the reduced portions 15 and 18 is a rotor indicated generally at 20, the rotor being held in fixed position on the shaft by means of the key 22, and restrained against axial movement by the lock ring 23 and by the hub portion 24 of a fan indicated generally at 25.

The plates forming the rotor are held together by a series of stud members 26, illustrated in more detail in Figure 3, and circumferentially spaced between the stud members 26 are a plurality of rotor openings 27, of relatively large diameter, which accommodates passage of air from one side of the rotor to the opposite side thereof.

Mounted coaxially with respect to the rotor 20 and the shaft 9 is the stator, 28, which has the stator coils indicated generally at 29 supported thereby, and which is provided with side frame members 30 having internally shouldered portions 32 for receiving the defining edges of the end plates 6 and securing the same in fixed position thereon by means of the series of peripherally extending bolts 33.

Each of the stator frames 30 is provided with integrally formed offset supporting base portions 34 as shown in detail in Figure 1, which portions are adapted to support the motor in fixed position on a supporting frame.

Between the shouldered outer periphery of the stator frames 30 and their inner radially extending portions which engage opposite sides of the stator 28, the frames 30 are provided with circumferentially spaced openings 36, which openings provide for communication between the annular periphery of the stator 28 and the enclosures formed between the stator and rotor and the end plates 6 about the retaining ring 10 and flange 7.

The stator frames 30 are also provided with annular cylindrical portions at their external periphery, these portions being adapted to receive a flat closure strip 38, which strip is bent annularly to extend about the peripheries of the stator frames 30 to enclose the space therebetween about the external surface of the stator 28, forming an annular duct or passageway about the external surface of the stator 28. A radially extending partition member 39 is provided intermediate the extending portions of the stator frames 30, and serves to provide two separated annular ducts 40 and 42, as shown in detail in Figure 2.

The member 38 is secured at its opposite ends to the sides of the integrally formed foot portions 34 of the stator frames by means of screws 43, as shown in Figure 1, and does not extend to the base of the motor, whereby openings 44 and 45 are provided at the ends of the passageways formed by the member 38 and the partition 39.

The opening 45 constitutes an inlet opening for the passageway 42, and is so disposed as to allow air to be drawn from beneath the foot portion 34 and from the sides of the foot portions into the opening 45 and thence into the passageway 42. From the passageway 42, the air is adapted to pass through the openings 36 into the right hand chamber indicated at 48 in Figure 2, this air passing through the openings in the stator frame and thence around the stator coils 29, from whence it passes into the openings 27 formed in the rotor, and is drawn through these openings by the rotation of the fan 25. The fan 25 is of the form generally shown in Figure 2, having a plurality of spaced radially extending rib portions 49 which serve to push the air outwardly by centrifugal force around the left hand end of the stator coil 29, into the chamber 50 formed at the left hand end of the motor as viewed in Figure 2. The air from the chamber 50 is pushed through the corresponding opening 36 of the left hand stator frame member, and thence into the annular passageway 40. The air from the passageway 40 is then forced outwardly through the outlet opening 44. Preferably the outlet opening 44 is provided with a baffle member 52, which may be formed as an extension of the partition member 39, and which serves to deflect the air being expelled through the opening 44 away from the air entering the inlet 45, so that the heated air passing outwardly from the motor housing is not immediately drawn into the inlet for the fresh air.

The motor is actuated by means of terminal connections extending into the terminal box 53, mounted at one side of the motor, which box is provided with a cover 54 having gasketed water-tight engagement therewith and secured in position by the screws 55. From the watertight housing 53, the terminal leads are extended into the motor and connected to the stator coils in the usual manner.

It is therefore apparent that I have provided a construction wherein the rotation of the rotor, which has the fan 25 mounted for conjoint rotation therewith, results in the drawing in of air about the annular passageway 42, and the passage of this air inwardly of the motor around the stator coils and through the rotor to the opposite side of the motor, from whence this air is dispelled around the opposite side of the rotor coils and back through the stator frame to the annular passage 40. This insures the circulation of large volumes of cooling air over the stator and rotor, thus assuring ample ventilation of the parts of the motor which may become heated, and also insuring for maximum heat radiation from these parts into the circulated air stream. This results in cool operating temperatures for the motor, retaining the motor at its point of highest operating efficiency.

Because of the fact that the inlet and outlet 45 and 44, respectively, are disposed at the bottom of the motor, any possibility of water splashing into these openings and then being allowed to pass into the interior of the motor is prevented, since even if water rises to the level of the openings 44 and 45, it still will not pass upwardly therethrough, due to gravity, and hence the motor can be subjected to washing by means of hoses or the like, or can be subjected to falling water or other liquids, without in anywise subjecting it to the entrance of liquid to the interior thereof which might damage or impair the efficiency of the motor.

It will be noted that the enclosing end plates 6 are of standard construction, and may be of the same shape as the end plates used on open type motors. This makes it readily possible to reproduce any special registers, flange mountings or the like that are available in open types of motors. Also, it will be apparent that the external dimensions of the motor have not been increased to any extent by the addition of the cooling means therefor, and the stator frames and end plates are substantially identical with open type motors of the same rating. This insures that a motor with these improved operating characteristics can be installed in the same space as an open type motor of the same rating would require.

It should also be noted that by means of the novel air circulating system provided by the present construction, the air circulates over the entire stator core and all of the coils, while it is admitted and exhausted underneath the motor, so that the motor retains its splash-proof characteristics.

Figure 4:
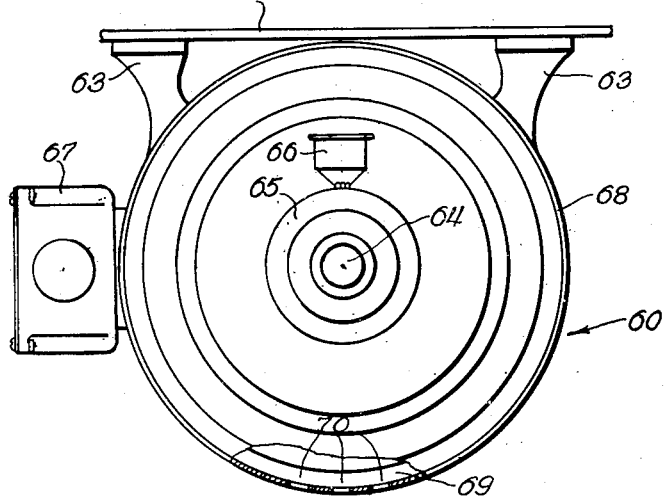
Figure 4 is an end elevational view of a modified form of construction.

In Figure 4 is disclosed a modified form of the present invention, in which a motor such as indicated at 60 is mounted in inverted position on a ceiling or other supporting member 62 by means of the integrally formed supporting legs 63. The motor shaft is indicated at 64, and extends through suitable bearing and lubricating means 65 and 66 as is customary. The terminal box for the motor is indicated generally at 67.

The motor of the embodiment shown in Figure 4 is provided with an annular closure plate indicated at 68, extending about the stator frames of the motor and forming a circulating annular air passage thereabout, with the inlet and outlet openings being formed at the portion of the circumference of the motor which is disposed farthest from the ceiling 62. A suitable partition member 69 is interposed in the chamber formed by the annular strip 68, forming the same into two chambers corresponding to the chambers 40 and 42. The inlet and outlet openings for the respective chambers are provided by openings 70 formed in the periphery of the member 68 adjacent its lowermost portion, whereby air can be sucked into one of the annular passageways extending about the stator, circulated about the stator and through the rotor to the opposite side of the stator, and then expelled through the second annular passage, in the same manner as described in connection with Figure 1.

Even if a motor of the type shown in Figure 4 were subjected to washing by a hose or the like, and water would enter through the openings 70, this water would immediately drain off due to the fact that the openings are disposed at the lowermost portion of the motor housing, and consequently no water would enter into the interior of the housing. Thus a motor such as shown in Figure 4 retains all of its splash-proof characteristics while being also capable of insuring ample ventilation and radiation of the motor to insure cool-off rating temperature.

It is therefore believed that I have provided a novel type of construction and a novel method of cooling a motor of the splash-proof type, which requires no change in the external dimensions of any of the parts of the motor, and which is capable of economical and simplified production.

I am aware that various changes may be made in details of construction and disposition of various constituent parts of the present design, and I therefore do not intend to limit the invention except as defined by the scope and spirit of the appended claims.

I claim:

1. A motor comprising a pair of closed end plates, a stator frame therebetween having an annular channel in its outer periphery, a closure engaging over the defining edges of said channel dividing said channel into two parallel passages opening beneath said motor to atmosphere, said stator frame having lateral openings at opposite sides into said end plates, a rotor having openings extending axially therethrough, and fan means on said rotor for circulating air from one of said passages through said openings into one end plate and around one side of said stator frame, through said rotor and about the other side of said stator frame within the opposite end plate and through said opposite openings into the other of said passages.

2. A motor having enclosed end plates, a stator frame disposed between said end plates, an annular enclosed duct about said stator frame, a partition dividing said duct into two passageways, means in said stator frame defining openings providing lateral communication between said passageways and the interior of said end plates, a rotor within said frame, said rotor having spaced axially extending openings therein, and means on said rotor for drawing air into one of said passageways, through said openings on one side of said stator frame and said end plate and said rotor openings to the openings on the opposite side of said stator frame and expelling said air through other of said stator openings into the other of said passageways.

3. A motor of the enclosed type having a stator and a stator frame, a rotor within said stator having a series of spaced openings extending axially therethrough, a pair of laterally separated annular air passages about said stator frame, means forming closed chambers at opposite ends of said motor and providing communication from said rotor over the ends of said stator into the adjacent annular passages, and means on said rotor for drawing air into one of said passages, about one side of said stator and stator frame, through said rotor openings and about the other side of said stator and stator frame for expelling said air into the other of said passages, said last-named passages having mean for deflecting the expelled air away from the inlet to the other of said passages.

4. A motor of the enclosed type having a stator and a stator frame, a rotor within said stator having a series of spaced openings extending axially therethrough, a pair of laterally separated annular air passages about said stator frame, means forming closed chambers at opposite ends of said motor and providing ocmmunication from the ends of said rotor over the adjacent ends of said stator into the adjacent annular passages, and means on said rotor for drawing air into one of said passages, about one side of said stator and stator frame, through said rotor openings and about the other side of said stator and stator frame for expelling said air into the other of said passages, said passages having normally directed openings at one side of said motor adjacent the base thereof communicating with the atmosphere.

5. The method of cooling a splash-proof motor having a stator and a rotor, which comprises drawing air from beneath said motor circumferentially about the stator thereof, passing said air from the external central surface of said stator laterally toward one side thereof about one end of said stator, moving said air radially inward and thence axially through the rotor of said motor toward the opposite side thereof, then moving said air radially outwardly past the opposite end of said stator and axially toward the central external periphery of said stator, and expelling said air from about the periphery of said stator at a point beneath said motor.

6. The method of cooling a motor having a stator and a rotor within said stator which comprises setting up an air circulation about the central external periphery of said stator, drawing said air about one side of said stator and axially through said rotor to the opposite side of said stator, forcing said air past said opposite side of said stator toward the central external periphery thereof, and discharging said air in a direction such as to prevent interference with said setting up of said initial air circulation.

7. The method of cooling a motor having a stator and a rotor, which comprises continuously moving fresh air from the central external periphery of said stator about one end of said stator and thence axially through said rotor to the opposite end of said stator, and separately discharging said air from said opposite end of said stator about the central external periphery thereof.

8. The method of cooling a motor having a stator and a rotor, which comprises continuously circulating fresh air from beneath said motor about the central external periphery of said stator and about one end thereof axially through said rotor and about the opposite end of said stator to said central external periphery thereof, and separately discharging said circulated air beneath said motor.

9. In the method of cooling a splash-proof electric motor having closed ends, the novel steps which comprise drawing air from beneath said motor, circulating said air about the central periphery of said motor and axially toward one of said ends, reversing the direction of movement of said air at said end adjacent the axis of said motor to move said air toward the opposite end of said motor, moving said air from said opposite end axially toward the central periphery of said motor, and expelling said air independently of the incoming air drawn from beneath the motor.

10. In the method of cooling an enclosed type motor, wherein fresh air from beneath said motor is drawn into an annular duct about the stator of said motor, and circulated air is discharged from a separate annular duct about the stator of said motor, the novel procedure comprising circulating air from said first duct about one end of said stator, axially through the rotor to the opposite end of said stator, and thence to said second duct.

11. In an electric motor having enclosed end plates and a stator frame having an annular channel formed in its periphery between said end plates, the method of cooling said motor which comprises drawing fresh air from one side of said channel around one end of said motor and axially through said motor toward the opposite end thereof, forcing said air from said opposite end radially outwardly over the opposite end of said motor and back axially to said channel, and discharging said circulated air from said channel independently of the fresh air being supplied thereto.

12. In combination, a motor comprising a stator and frame having spaced radial walls defining an outwardly opening annular peripheral channel thereabout, a rotor within said stator, end closure plates engaging said walls and defining chambers about opposite sides of said stator and rotor communicating through said walls with said channel, an annular closure member engaging said walls for closing said channel, a radial partition member dividing said channel into two separate passageways, a radially ribbed fan member on said rotor, said rotor having spaced openings extending axially therethrough to provide communication therethrough between said end chambers, and means forming outlet openings adjacent the lower side of said motor for each of said passageways.

13. The combination of claim 12 with an overhead support, said motor being mounted in inverted position on said support, and said last-named openings being formed in the lower periphery of said closure member.

14. In combination, an electric motor having a stator and a rotor, said rotor having axially extending openings therethrough, an external cylindrical enclosure for said stator having two parallel separated passageways both open to atmosphere, end plates for said motor forming end closures therefor, said enclosure having circumferential ports opening laterally into said end plates, and a fan on one end of said rotor within one end plate for drawing air through one of said passageways and through the lateral ports into the opposite end plate, thence axially through said rotor to said fan, and for forcing air from said fan through the associated end plate and said ports into the other of said passageways.

JOHN B. SINNETT.